(12) United States Patent
Song et al.

(10) Patent No.: US 9,204,453 B2
(45) Date of Patent: Dec. 1, 2015

(54) METHODS AND APPARATUS FOR DEFINING AND USING SEQUENCES FOR RESOURCE SETS FOR ENHANCED INTER-CELL INTERFERENCE COORDINATION

(75) Inventors: Osok Song, San Diego, CA (US); Rajat Prakash, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1016 days.

(21) Appl. No.: 13/283,479

(22) Filed: Oct. 27, 2011

(65) Prior Publication Data

US 2012/0106476 A1    May 3, 2012

Related U.S. Application Data

(60) Provisional application No. 61/408,182, filed on Oct. 29, 2010.

(51) Int. Cl.
*H04W 4/00* (2009.01)
*H04W 72/08* (2009.01)
*H04W 72/04* (2009.01)

(52) U.S. Cl.
CPC ........ *H04W 72/082* (2013.01); *H04W 72/0426* (2013.01)

(58) Field of Classification Search
CPC ........................ H04W 72/082; H04W 72/0426
See application file for complete search history.

(56) References Cited

U.S. PATENT DOCUMENTS 8,712,401 B2 * 4/2014 Yoo et al. ................. 455/423
8,798,021 B2 * 8/2014 Mangalvedhe et al. ....... 370/338

2010/0080139 A1 4/2010 Palanki et al.
2011/0013554 A1 1/2011 Koskinen
2011/0092231 A1 4/2011 Yoo et al.
(Continued)

FOREIGN PATENT DOCUMENTS

WO    WO-2009129413 A2    10/2009

OTHER PUBLICATIONS

Huawei: "LTE non-CA based HetNet support", 3GPP Draft; R1-101982, 3rd Generation Partnership Project (3GPP), Mobile Competence Centre ; 650, Route Des Lucioles ; F-06921 Sophia-Antipolis Cedex ; France, vol. RAN WG1, No. Beijing, china; 20100412, Apr. 6, 2010, XP050419319, [retrieved on Apr. 6, 2010], pp. 1-7.

(Continued)

*Primary Examiner* — Robert Wilson
(74) *Attorney, Agent, or Firm* — Patterson & Sheridan, LLP

(57) ABSTRACT

Aspects of the present disclosure may simplify the negotiation of resources by defining and/or using sequences for sets of resources for enhanced inter-cell interference coordination. According to aspects, a configuration of protected resources may have an ordering such that a pattern representing 'k' protected resources overlaps with a pattern representing 'k+1' protected resources. In an aspect, each pattern may comprise a bitmap with one or more bits set to a value to indicate the one or more protected subframes. In an aspect, a bitmap of a pattern corresponding to 'k' protected subframes differs from a bitmap of a pattern corresponding to 'k+1' protected subframes by a single bit value. According to aspects, an interfering evolved Node B may limit transmissions during protected subframes based on the selected pattern.

68 Claims, 6 Drawing Sheets

(56) References Cited

U.S. PATENT DOCUMENTS

| | | | |
|---|---|---|---|
| 2011/0099223 A1 | 4/2011 | Littlejohn et al. | |
| 2011/0116437 A1 | 5/2011 | Chen et al. | |
| 2011/0149894 A1 | 6/2011 | Luo et al. | |
| 2011/0235582 A1* | 9/2011 | Chen et al. | 370/328 |
| 2011/0292823 A1* | 12/2011 | Barbieri et al. | 370/252 |
| 2012/0093010 A1* | 4/2012 | Vajapeyam et al. | 370/252 |
| 2012/0093095 A1* | 4/2012 | Barbieri et al. | 370/329 |
| 2012/0106476 A1* | 5/2012 | Song et al. | 370/329 |
| 2012/0113843 A1* | 5/2012 | Watfa et al. | 370/252 |
| 2012/0255468 A1* | 10/2012 | Muhrenberg et al. | 109/24.1 |

OTHER PUBLICATIONS

International Search Report and Written Opinion—PCT/US2011/058437—ISA/EPO—Feb. 24, 2012.

Panasonic: "Simulation Results for Time Domain ICIC in HetNets—Macro and Pico Cells with Range Extension", 3GPP Draft; R1-105502 Hetnet EICIC Results TDM, 3rd Generation Partnership Project (3GPP), Mobile Competence Centre; 650, Route Des Lucioles; F-06921 Sophia-Antipolis Cedex; France, vol. RAN WG1, No. Xi'an; 20101011, Oct. 5, 2010, XP050450622, [retrieved on Oct. 5, 2010] the whole document, pp. 1-9.

Alcatel-Lucent, Alcatel-Lucent Shanghai Bell,"Details of Time-domain Extension of Rel-8/9 Backhaul-Based ICIC for Macro-Pico Case",3GPP TSG-RAN WG1#62b, R1-105214,<URL:http://www.3gpp.org/ftp/tsg_ran/WG1_RL1/TSGR1_62b/Docs/R1-105214.zip>,Oct. 14, 2010, pp. 1-2.

Huawei, HiSilicon,"Way forward on backhaul-based eICIC",3GPP TSG-RAN WG1#62b, R1-105726,<URL:http://www.3gpp.org/ftp/tsg_ran/WG1_RL1/TSGR1_62b/Docs/R1-105726.zip>,Oct. 14, 2010, pp. 1-4.

NTT Docomo,"Views on eICIC Schemes for Rel-10",3GPP TSG-RAN WG1#62b, R1-105724,<URL:http://www.3gpp.org/ftp/tsg_ran/WG1_RL1/TSGR1_62b/Docs/R1-105724.zip>,Oct. 14, 2010, pp. 1-4.

Samsung,"Support of time domain ICIC in Rel-10",3GPP TSG-RAN WG1#62b, R1-105406,<URL:http://www.3gpp.org/ftp/tsg_ran/WG1_RL1/TSGR1_62b/Docs/R1-105406.zip>,Oct. 6, 2010, pp. 1-4.

* cited by examiner

METHODS AND APPARATUS FOR DEFINING AND USING SEQUENCES FOR RESOURCE SETS FOR ENHANCED INTER-CELL INTERFERENCE COORDINATION

CROSS-REFERENCE TO RELATED APPLICATIONS

This application claims benefit of priority to U.S. Provisional Application Ser. No. 61/408,182, filed on Oct. 29, 2010, which is expressly herein incorporated by reference.

BACKGROUND

I. Field

Aspects of the present disclosure generally relate to wireless communications and, more particularly, to methods for limiting transmissions during protected subframes for enhanced inter-cell interference coordination (eICIC).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from one or more neighbor base stations. On the uplink, a transmission from the UE may cause interference to transmissions from one or more other UEs communicating with the one or more neighbor base stations. The interference may degrade performance on both the downlink and uplink.

SUMMARY

In an aspect of the disclosure, a method for wireless communications is provided. The method generally includes receiving a plurality of patterns of one or more protected subframes in which use by an evolved Node B (eNB) is limited, wherein each protected subframe of a pattern representing 'k' protected subframes overlaps with a corresponding protected subframe of a pattern representing 'k+1' protected subframes, selecting one of the patterns, and limiting transmissions during protected subframes of the selected pattern.

In an aspect of the disclosure, an apparatus for wireless communications is provided. The apparatus generally includes means for receiving a plurality of patterns of one or more protected subframes in which use by an evolved Node B (eNB) is limited, wherein each protected subframe of a pattern representing 'k' protected subframes overlaps with a corresponding protected subframe of a pattern representing 'k+1' protected subframes, means for selecting one of the patterns, and means for limiting transmissions during protected subframes of the selected pattern.

In an aspect of the disclosure, an apparatus for wireless communications is provided. The apparatus generally includes at least one processor and a memory coupled to the at least one processor. The at least one processor is generally configured to receive a plurality of patterns of one or more protected subframes in which use by an evolved Node B (eNB) is limited, wherein each protected subframe of a pattern representing 'k' protected subframes overlaps with a corresponding protected subframe of a pattern representing 'k+1' protected subframes, select one of the patterns, and limit transmissions during protected subframes of the selected pattern.

In an aspect of the disclosure, a computer-program product for wireless communications is provided. The computer-program product generally includes a non-transitory computer-readable medium having code stored thereon. The code is generally executable by one or more processors for receiving a plurality of patterns of one or more protected subframes in which use by an evolved Node B (eNB) is limited, wherein each protected subframe of a pattern representing 'k' protected subframes overlaps with a corresponding protected subframe of a pattern representing 'k+1' protected subframes, selecting one of the patterns, and limiting transmissions during protected subframes of the selected pattern.

In an aspect of the disclosure, a method for wireless communications is provided. The method generally includes generating a plurality of patterns of bits, wherein each bit represents whether or not a corresponding subframe is protected by limiting transmission of an evolved Node B (eNB) and wherein each protected subframe of a pattern representing 'k' protected subframes overlaps with a corresponding protected subframe of a pattern representing 'k+1' protected subframes, and transmitting the sequence of patterns to potentially interfering eNBs.

In an aspect of the disclosure, an apparatus for wireless communications is provided. The apparatus generally includes means for generating a plurality of patterns of bits, wherein each bit represents whether or not a corresponding subframe is protected by limiting transmission of an evolved Node B (eNB) and wherein each protected subframe of a pattern representing 'k' protected subframes overlaps with a corresponding protected subframe of a pattern representing 'k+1' protected subframes, and means for transmitting the plurality of patterns to potentially interfering eNBs.

In an aspect of the disclosure, an apparatus for wireless communications is provided. The apparatus generally includes at least one processor and a memory coupled to the at least one processor. The at least one processor is generally configured to generate a plurality of patterns of bits, wherein each bit represents whether or not a corresponding subframe is protected by limiting transmission of an evolved Node B (eNB) and wherein each protected subframe of a pattern representing 'k' protected subframes overlaps with a corresponding protected subframe of a pattern representing 'k+1' protected subframes, and transmit the plurality of patterns to potentially interfering eNBs.

In an aspect of the disclosure, a computer-program product for wireless communications is provided. The computer-program product generally includes a non-transitory computer-readable medium having code stored thereon. The code is generally executable by one or more processors for generating a plurality of patterns of bits, wherein each bit represents whether or not a corresponding subframe is protected by limiting transmission of an evolved Node B (eNB) and wherein each protected subframe of a pattern representing 'k' protected subframes overlaps with a corresponding protected subframe of a pattern representing 'k+1' protected subframes, and transmitting the plurality of patterns to potentially interfering eNBs.

In an aspect of the disclosure, a method for wireless communications is provided. The method generally includes receiving a plurality of patterns of one or more protected subframes in which use by an interfering evolved Node B (eNB) is limited, wherein each protected subframe of a pattern representing 'k' protected subframes overlaps with a corresponding protected subframe of a pattern representing 'k+1' protected subframes, and receiving an indication of one or more selected patterns from one or more respective interfering eNBs.

In an aspect of the disclosure, an apparatus for wireless communications is provided. The apparatus generally includes means for receiving a plurality of patterns of one or more protected subframes in which use by an interfering evolved Node B (eNB) is limited, wherein each protected subframe of a pattern representing 'k' protected subframes overlaps with a corresponding protected subframe of a pattern representing 'k+1' protected subframes, and means for receiving an indication of one or more selected patterns from one or more respective interfering eNBs.

In an aspect of the disclosure, an apparatus for wireless communications is provided. The apparatus generally includes at least one processor and a memory coupled to the at least one processor. The at least one processor is generally configured to receive a plurality of patterns of one or more protected subframes in which use by an interfering evolved Node B (eNB) is limited, wherein each protected subframe of a pattern representing 'k' protected subframes overlaps with a corresponding protected subframe of a pattern representing 'k+1' protected subframes, and receive an indication of one or more selected patterns from one or more respective interfering eNBs.

In an aspect of the disclosure, a computer-program product for wireless communications is provided. The computer-program product generally includes a non-transitory computer-readable medium having code stored thereon. The code is generally executable by one or more processors for receiving a plurality of patterns of one or more protected subframes in which use by an interfering evolved Node B (eNB) is limited, wherein each protected subframe of a pattern representing 'k' protected subframes overlaps with a corresponding protected subframe of a pattern representing 'k+1' protected subframes, and receiving an indication of one or more selected patterns from one or more respective interfering eNBs.

DETAILED DESCRIPTION

As described in more detail below, enhanced inter-cell interference coordination (eICIC), allows a user equipment (UE) to more efficiently receive service from a cell that is not the strongest cell. According to aspects of the present disclosure, strong cells may create protected resources by limiting transmission during protected subframes. The protected resources may be almost blank subframes (ABS) created by, for example, macro cells based on a received pattern of protected resources generated by a network.

The ABSs may be used by cells which are not the strongest, for example, pico cells, to serve UEs. Certain aspects of the present disclosure provide techniques for allowing a weak cell to receive an indication of selected patterns from one or more interfering cells where use by the interfering cells is limited.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
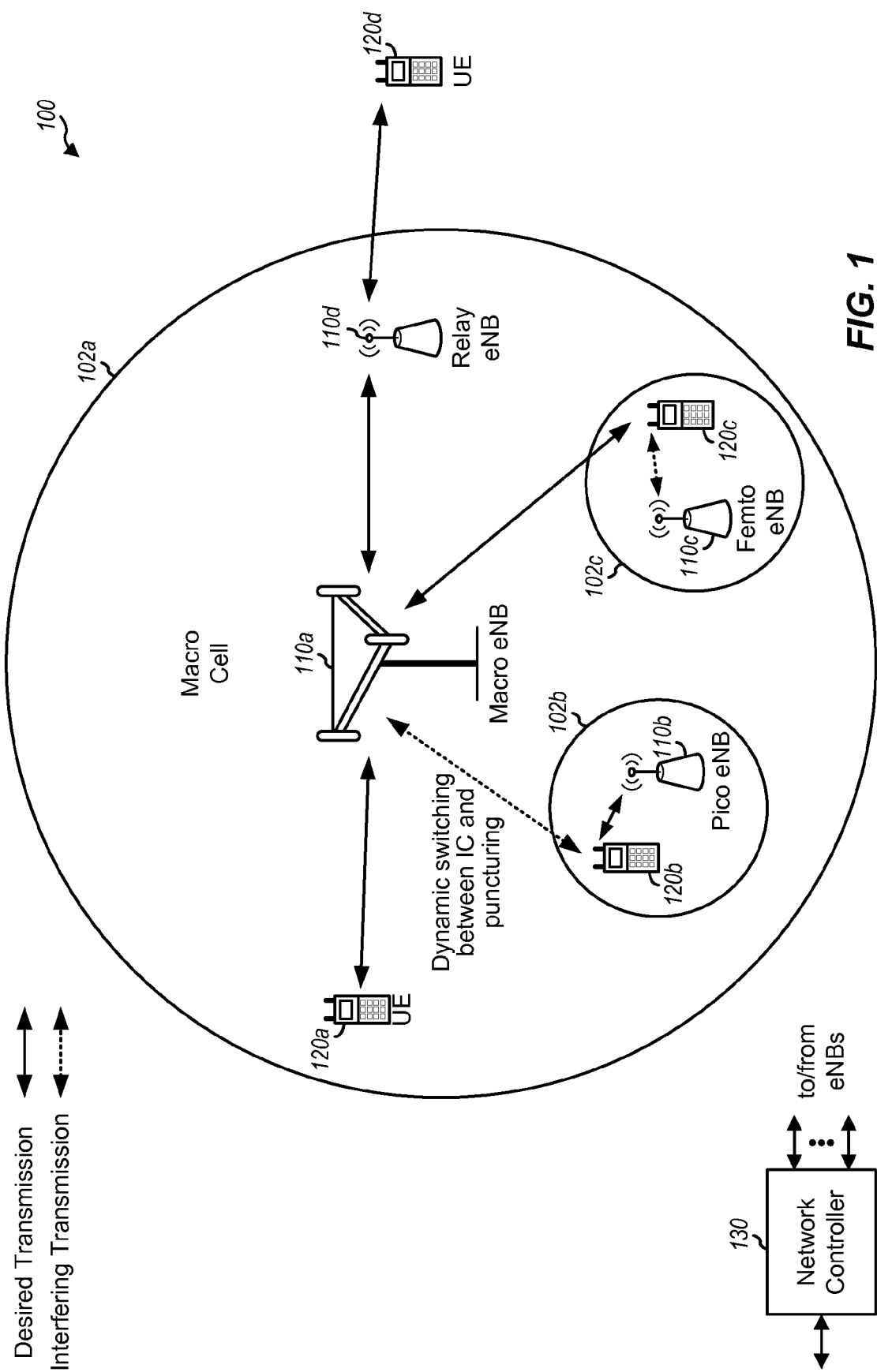
FIG. 1 is a block diagram conceptually illustrating an example of a wireless communications network in accordance with certain aspects of the present disclosure.

FIG. 1 shows a wireless communication network 100 in which procedures described for performing reference signal processing utilizing resource partitioning information may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
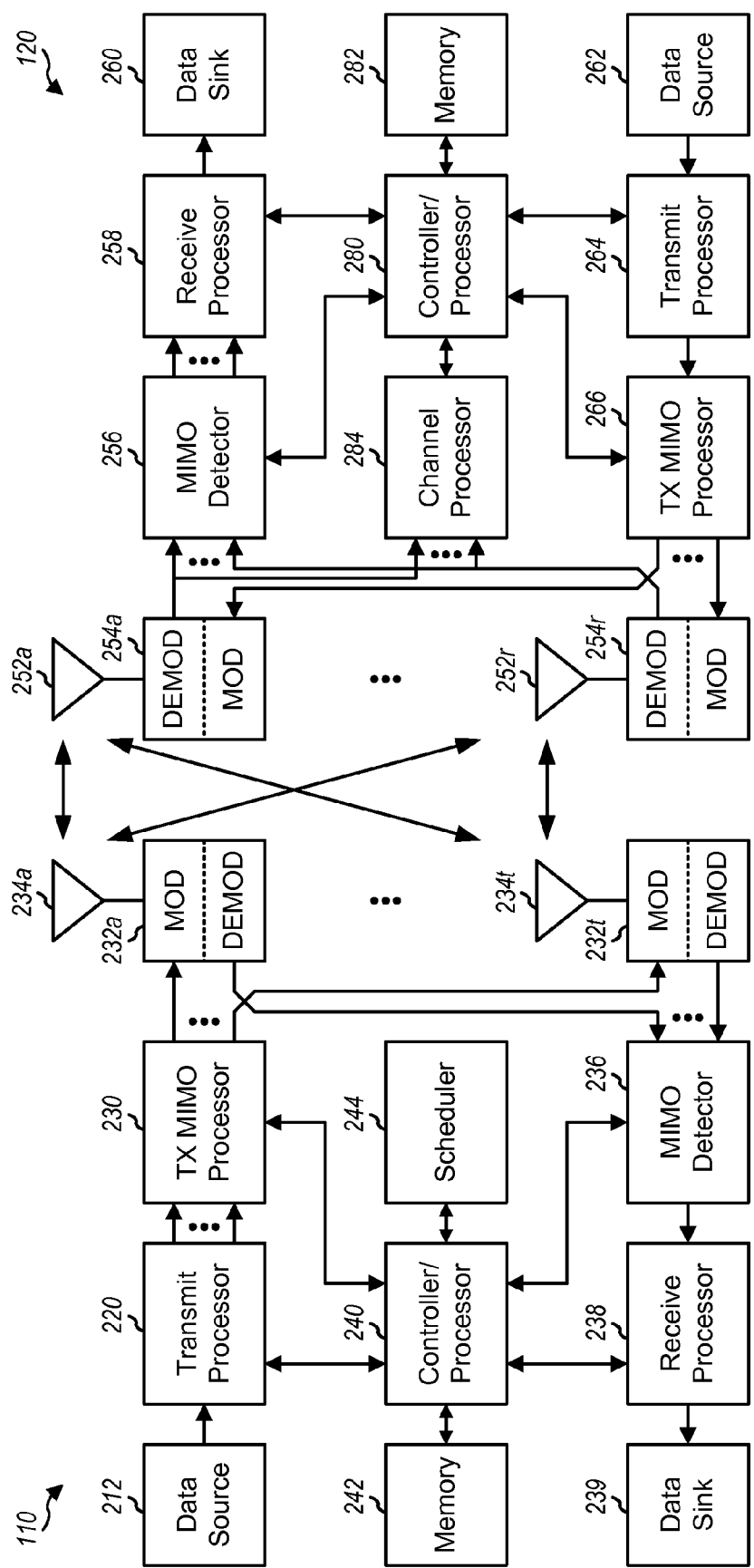
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine reference signal received power (RSRP), received signal strength indicator (RSSI), reference signal received quality (RSRQ), CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
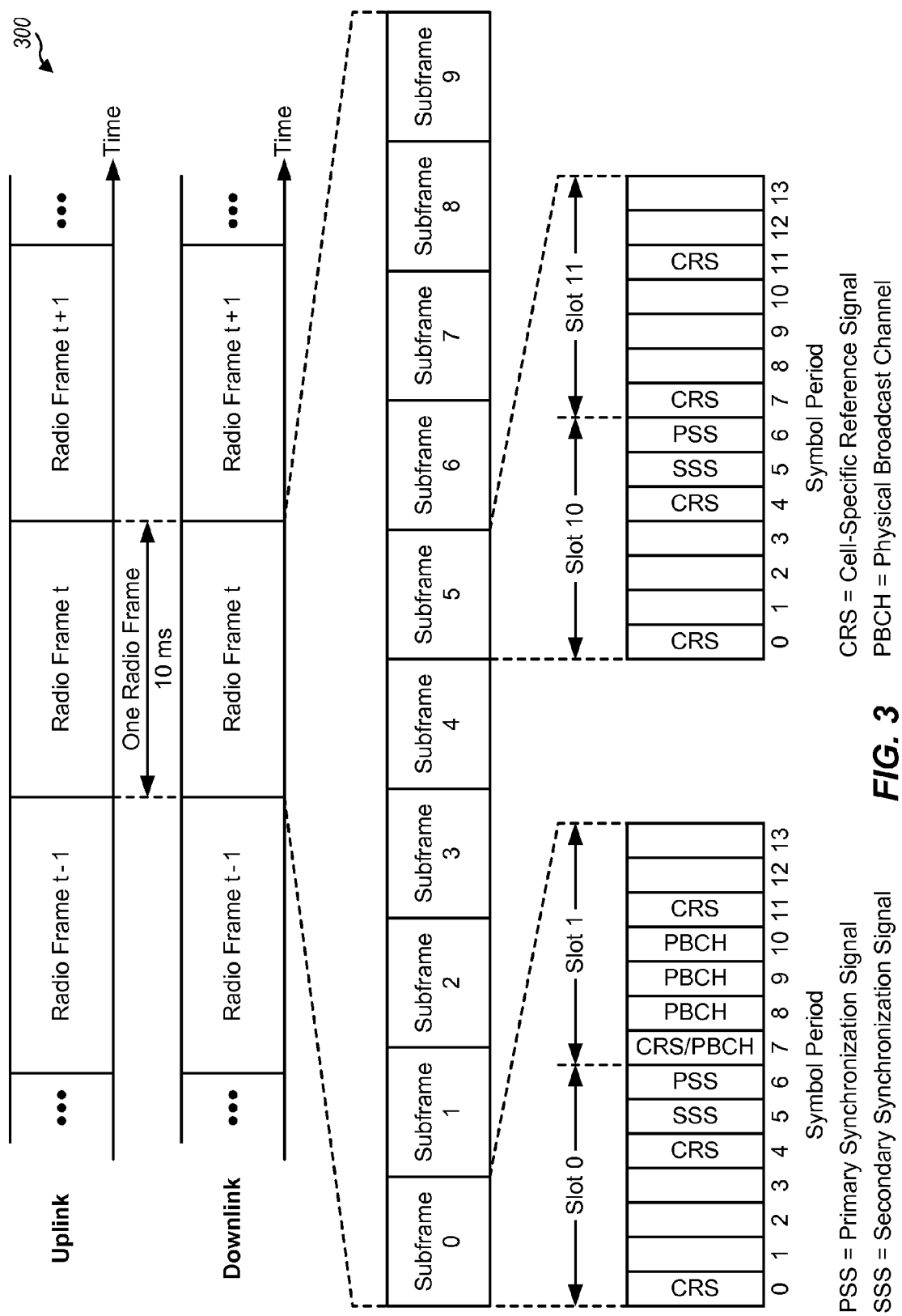
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

Defining and/or Using Sequences for Resource Sets for Enhanced Inter-Cell Interference Coordination Enhanced inter-cell interference coordination (eICIC) allows a UE to more efficiently receive service from a cell that is not the strongest cell by allowing offload from one or more stronger cells to a lower power cell. Additionally, eICIC allows a UE to connect to a macro cell when the UE is close to a non-allowed femto cell.

According to aspects of the present disclosure, eICIC techniques involve creating protected time-domain resources in which use by one or more interfering or potentially interfering cells is limited, such as an almost blank subframe (ABS). ABSs of strong, potentially interfering macro cells may be used by a weaker pico cell, allowing UEs to more efficiently receive service from the weaker pico cell. According to aspects, the ABSs of one or more macro cells may be used by a pico cell to serve a UE for which the pico cell is not the strongest cell.

ABSs consist of two parts: semi-static ABSF and adaptive ABSF. Semi-static ABS information is known to the UE via network signaling (e.g., broadcast or dedicated). The network may determine the semi-static ABS via inter-eNB negotiation or via operation and maintenance (OAM) configuration. The UE may use semi-static ABS information to restrict measurements for radio resource management and radio link management, allowing for a more robust connection to a weaker serving cell.

Adaptive ABS information may be used for scheduling by base stations, but may not be known by the UE. Depending on the loading at the network, the adaptive ABS settings may be negotiated among base stations at a fast time-scale. Aspects of the present disclosure relate to simplifying the negotiation of ABS configuration and improving robustness for eICIC.

As will be described in more detail below, a network may generate a plurality of patterns of bits and may transmit the patterns to potentially interfering eNBs. Each bit may represent whether or not a corresponding subframe is protected. The network may generate the patterns according to a sequence. For example, a pattern having 'k' protected subframes may overlap with a pattern having 'k+1' protected subframes. According to aspects, the bitmap of the pattern corresponding to 'k' protected subframes differs from the bitmap of a pattern having 'k+1' protected subframes by a single bit value.

According to aspects, potentially interfering eNBs may receive the plurality of patterns. The eNB may select one of the patterns, for example, based on determining an amount of resources that may be donated for use by another eNB. The potentially interfering eNB may send information identifying one or more of the protected subframes based on the determined amount and/or selected pattern to a pico eNB. For example, the potentially interfering eNB may send a bitmap with one or more bits set to a value to indicate the one or more protected subframes based on, for example, a determined amount of resources that it may donate to another eNB and/or the selected pattern.

The pico eNB may receive an indication of one or more selected patterns from respective interfering eNBs. Based on the received indication of one or more selected patterns, the pico eNB may determine a portion of a selected pattern that is static or semi-static. The pico eNB may send, to UEs, information identifying one or more protected subframes based on the received indication of selected patterns. The pico eNB may transmit data to a UE using one or more of the identified one or more protected subframes. According to aspects, the pico eNB may receive data from a UE using one or more protected subframes.

Figure 4:
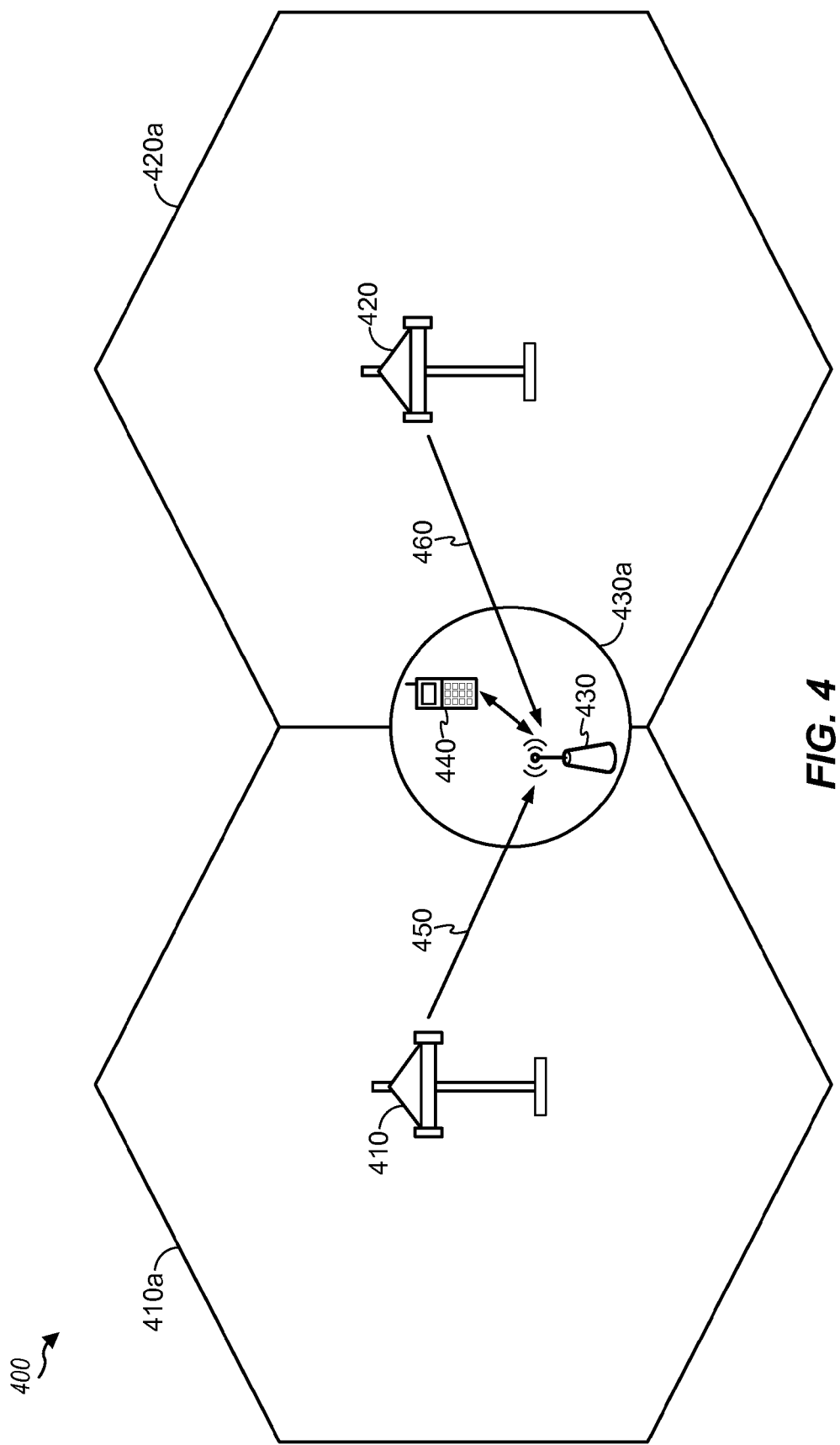
FIG. 4 illustrates an example exchange of messages in accordance with aspects of the present disclosure.

FIG. 4 illustrates an example exchange of messages 400, in accordance with aspects of the present disclosure. In the example shown in the FIG. 4, eNB 430 may be a pico eNB for pico cell 430a and eNBs 410 and 420 may be macro eNBs for macro cells 410a and 420a, respectively. Transmissions from macro eNBs 410, 420 may interfere with transmissions from pico eNB 430 serving UE 440. Accordingly, it may be beneficial for pico eNB 430 to receive a configuration of protected subframes in which use by one or more interfering macro eNBs 410, 420 is limited. While FIG. 4 illustrates two macro eNBs communicating with a pico eNB, any number of eNBs may interfere with transmissions from a pico eNB to a UE.

One or more interfering eNBs may each send configuration messages to the pico eNB. As illustrated, macro eNB 410 may transmit a configuration message 450 and macro eNB 420 may transmit a configuration message 460 to pico eNB 430. Configuration messages 450, 460 may indicate subframes in which use by the respective eNB is limited. For example, each configuration message may include information identifying one or more protected subframes based on a pattern selected by each eNB.

Transmissions from pico eNB 430 to UE 440 may experience lower interference in subframes where use by macro eNB 410 and macro eNB 420 is limited. Accordingly, for efficient operations, it may be desirable for the configuration of protected subframes provided by the macro eNBs 410, 420 to have as much overlap as possible. Pico eNB 430 may experience a higher signal to noise ratio (SNR) and hence a better data rate while transmitting during overlapping protected subframes.

According to current designs, macro eNBs 410, 420 may each compute a configuration of protected subframes based on various inputs and communicate the configuration to pico eNB 430. Based on the signaling between macro eNBs 410, 420 and pico eNB 430, the pico eNB 430 may be unable to distinguish between semi-static and dynamic parts of the protected resources. In this case, pico eNB 430 may be unable to signal the appropriate semi-static configuration to UE 440.

According to aspects of the present disclosure, a network may generate a plurality of patterns of bits and may transmit the patterns to potentially interfering eNBs. Each bit may indicate a protected subframe wherein an eNB is limiting transmission. The plurality of patterns of bits may follow a sequence. Thus, when the number of protected resources increases, the existing protected resources may remain unchanged, with new, protected resources being added.

According to aspects, a bitmap representing a configuration with 'k' protected resources and 'k+1' protected resources may overlap and may differ in only one bit position. For example, the following patterns of bits may be used:

Pattern 0='0000 0000'
Pattern 1='0000 0001'
Pattern 2='0001 0001'
Pattern 3='0001 0011'
Pattern 4='0011 0011'

The sequence of patterns may be defined by a standard specification or may be configured via OAM by an operator.

Potentially interfering eNBs may receive the plurality of patterns of bits generated, for example, by a network. The eNBs may determine an amount of resources that each may donate for use by another eNB. For example, referring back to FIG. 4, macro eNBs 410, 420 may determine respective amounts of resources that may be donated for use by pico eNB 430. Based on the determined amount of resources that each macro eNB may donate, the macros may select one of received the patterns of subframes and may limit transmissions during the protected subframes of the selected pattern According to aspects, each eNB may signal an indication of its selected pattern of protected resources. For example, macro eNB 410 may select a pattern of 'a' protected resources and signal an indication of 'a' protected subframes via configuration message 450 and macro eNB 420 may select a pattern of 'b' protected resources and signal an indication of 'b' protected subframes via configuration message 460 to pico eNB 430.

Pico eNB 430 may receive the indications of selected patterns and may be guaranteed that min(a, b) protected subframes will overlap. Using this information, pico eNB 430 may identify one or more overlapping protected subframes based on the selected pattern during which used by interfering eNBs are limited. Based on this information, the pico eNB may transmit data to a UE and/or receive data from a UE using one or more of the identified protected subframes.

Additionally, by using an ordering for protected subframes, a pico eNB may determine a portion of the one or more received selected patterns that is static and/or semi-static. When pico eNB 430 receives a configuration message 450 signaling, for example, an indication of Pattern 2, the pico eNB will know that Pattern 1 is the semi-static component of the protected subframes. The pico eNB 430 may use this information to more efficiently communicate with the UE 440.

Figure 5:
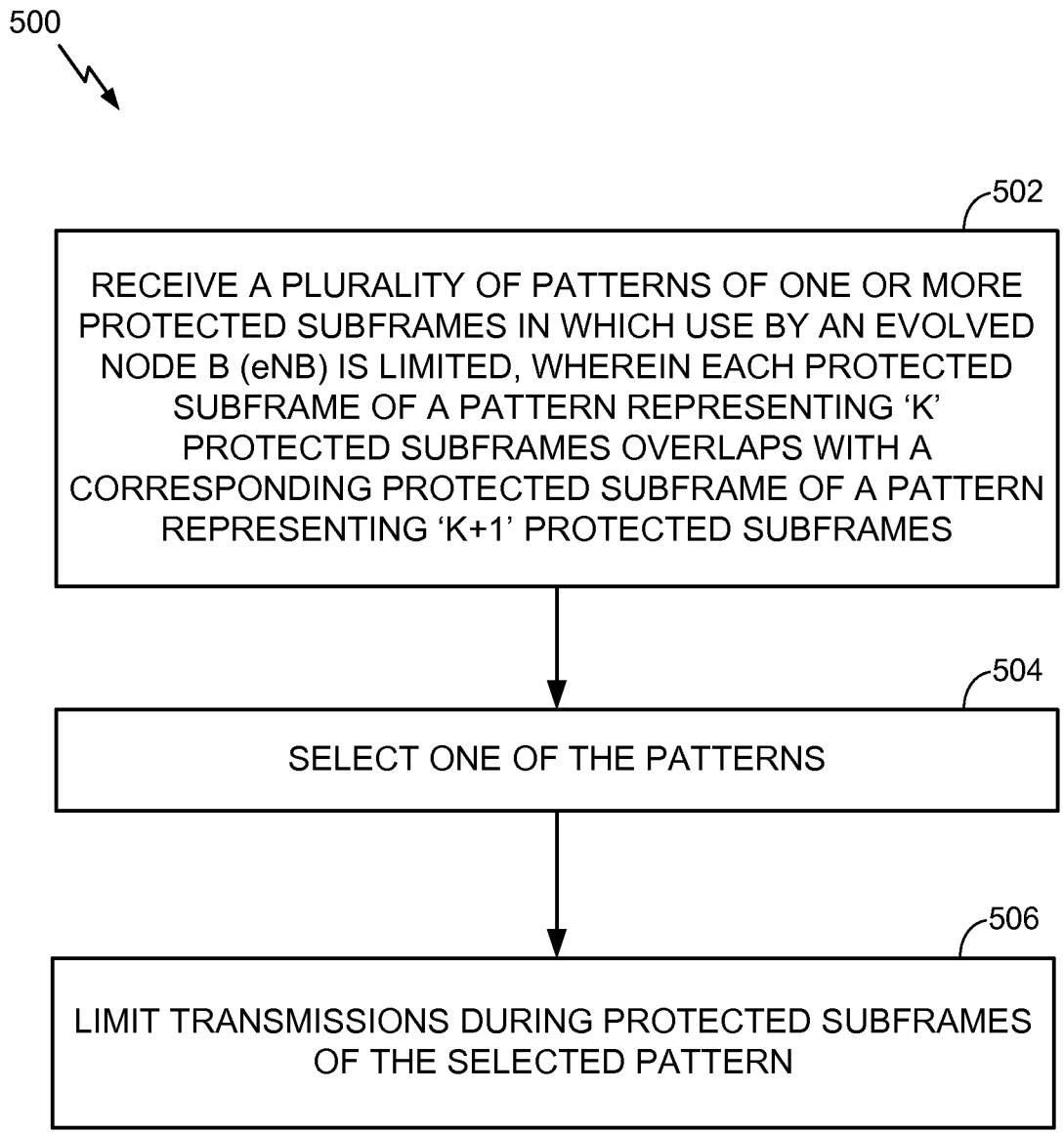
FIG. 5 illustrates example operations performed, for example, by an eNB, in accordance with aspects of the present disclosure.

FIG. 5 illustrates example operations 500 which may be performed, for example, by a potentially interfering macro eNB, according to aspects of the present disclosure. At 502, the eNB may receive a plurality of patterns of one or more protected subframes in which use by an evolved Node B (eNB) is limited, wherein each protected subframe of a pattern representing 'k' protected subframes overlaps with a corresponding protected subframe of a pattern representing 'k+1' protected subframes. At 504, the eNB may select one of the patterns. At 506, the eNB may limit transmissions during protected subframes of the selected pattern.

Figure 6:
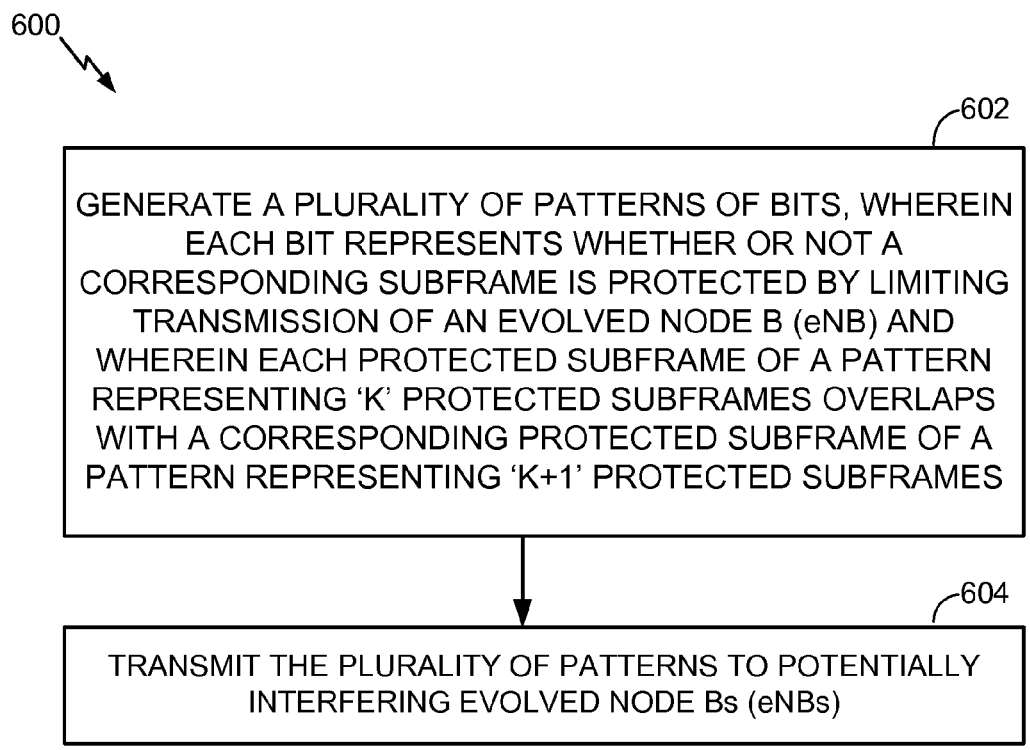
FIG. 6 illustrates example operations performed, for example, by a network, in accordance with aspects of the present disclosure.

FIG. 6 illustrates example operations 600 which may be performed, for example by a network, according to aspects of the present disclosure. At 602, the network may generate a plurality of patterns of bits, wherein each bit represents whether or not a corresponding subframe is protected by limiting transmission of an evolved Node B (eNB) and wherein each protected subframe of a pattern representing 'k' protected subframes overlaps with a corresponding protected subframe of a pattern representing 'k+1' protected subframes. At 604, the network may transmit the plurality of patterns to potentially interfering eNBs.

Figure 7:
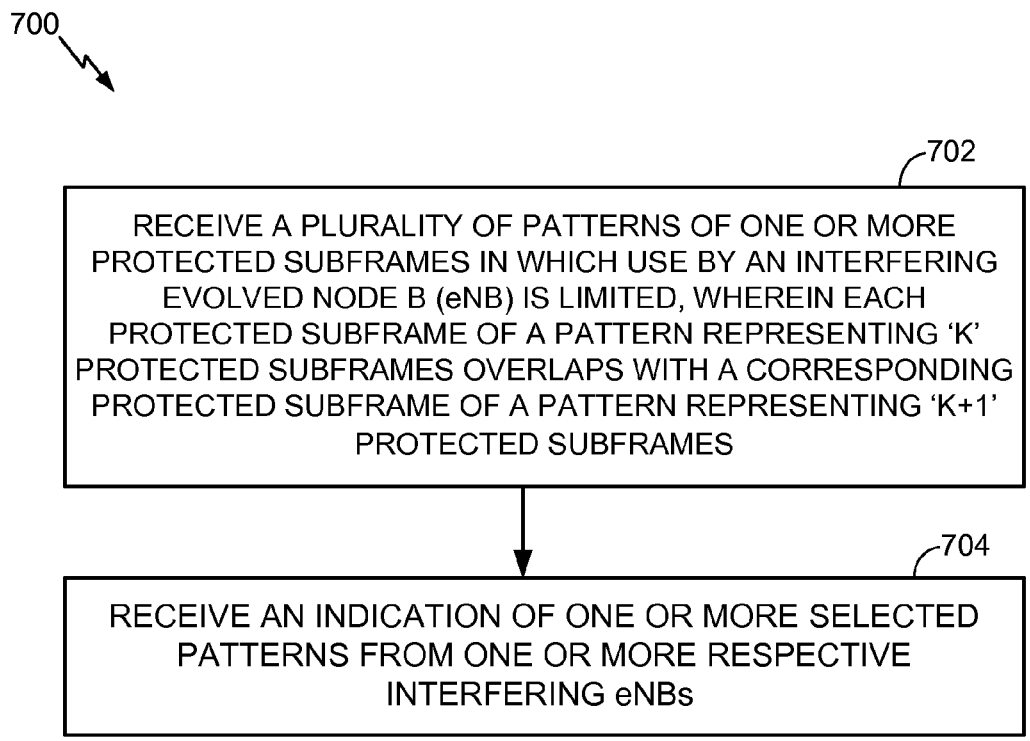
FIG. 7 illustrates example operations performed, for example, by an eNB, in accordance with aspects of the present disclosure.

FIG. 7 illustrates example operations 700 which may be performed, for example, by a pico eNB, according to aspects of the present disclosure. At 702, the pico eNB may receive a plurality of patterns of one or more protected subframes in which use by an interfering evolved Node B (eNB) is limited, wherein each protected subframe of a pattern representing 'k' protected subframes overlaps with a corresponding protected subframe of a pattern representing 'k+1' protected subframes. At 704, the pico eNB may receive an indication of one or more selected patterns from one or more respective interfering eNBs.

By defining sequences of protected resources as described herein, aspects of the present disclosure allow more efficient communication between a pico eNB and UE. A network may generate a sequence of patterns of protected resources. Each interfering eNB may select a pattern in the sequence based on an amount of resources it may donate to another eNB and may limit transmission during protected subframes of the selected pattern.

A pico eNB may receive indications of a selected pattern of protected resources from one or more interfering eNBs. Using this information, the pico eNB may determine an overlap of protected resources and identify the portion of the configuration that is likely to be static. Thus, the pico eNB may use offload from one or more macro cells to communicate with a UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
receiving a plurality of patterns of one or more protected subframes in which use by an evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero;
selecting one of the plurality of patterns; and
limiting transmissions during protected subframes of the selected pattern.

2. The method of claim 1, comprising:
determining an amount of resources that may be donated for use by another eNB; and
selecting one of the patterns based on the determined amount.

3. The method of claim 1, further comprising sending information identifying one or more protected subframes based on the selected pattern.

4. The method of claim 1, wherein the one or more protected subframes comprise an Almost Blank Subframe (ABS).

5. The method of claim 1, wherein the plurality of patterns of one or more protected subframes each comprise a bitmap with one or more bits set to a value to indicate the one or more protected subframes.

6. The method of claim 5, wherein the bitmap of a pattern corresponding to 'k' protected subframes differs from the bitmap of a pattern corresponding to 'k+1' protected subframes by a single bit value.

7. A method for wireless communications, comprising:
generating a plurality of patterns of bits, wherein each bit represents whether or not a corresponding subframe is protected by limiting transmission of an evolved Node B (eNB) and wherein each protected subframe of a pattern of bits of the plurality of patterns of bits representing 'k' protected subframes overlaps with a corresponding protected subframe of another pattern of bits of the plurality of patterns of bits representing 'k+1' protected subframes, wherein k comprises an integer value greater than zero; and
transmitting the plurality of patterns of bits to potentially interfering eNBs.

8. The method of claim 7, wherein the one or more protected subframes comprise an Almost Blank Subframe (ABS).

9. The method of claim 7, wherein the plurality of patterns of one or more protected subframes each comprise a bitmap with one or more bits set to a value to indicate the one or more protected subframes.

10. The method of claim 9, wherein the bitmap of a pattern corresponding to 'k' protected subframes differs from the bitmap of a pattern corresponding to 'k+1' protected subframes by a single bit value.

11. A method for wireless communications, comprising:
receiving, at an evolved Node B (eNB), a plurality of patterns of one or more protected subframes in which use by an interfering eNB is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero; and
receiving, at the eNB, an indication of one or more selected patterns of the plurality of patterns from one or more respective interfering eNBs.

12. The method of claim 11, further comprising determining a portion of a selected pattern of the received selected patterns that is static or semi-static based on the received indication of the one or more selected patterns.

13. The method of claim 11, further comprising sending information identifying one or more protected subframes based on the received indication of the one or more selected patterns to a user equipment (UE).

14. The method of claim 13, further comprising at least one of transmitting data to the UE or receiving data from the UE using one or more of the identified one or more protected subframes.

15. The method of claim 11, wherein the one or more protected subframes comprise an Almost Blank Subframe (ABS).

16. The method of claim 11, wherein the plurality of patterns of one or more protected subframes each comprise a bitmap with one or more bits set to a value to indicate the one or more protected subframes.

17. The method of claim 16, wherein the bitmap of a pattern corresponding to 'k' protected subframes differs from the bitmap of a pattern corresponding to 'k+1' protected subframes by a single bit value.

18. An apparatus for wireless communications, comprising:
means for receiving a plurality of patterns of one or more protected subframes in which use by an evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero;
means for selecting one of the plurality of patterns; and
means for limiting transmissions during protected subframes of the selected pattern.

19. The apparatus of claim 18, comprising:
means for determining an amount of resources that may be donated for use by another eNB; and
means for selecting one of the patterns based on the determined amount.

20. The apparatus of claim 18, further comprising means for sending information identifying one or more protected subframes based on the selected pattern.

21. The apparatus of claim 18, wherein the one or more protected subframes comprise an Almost Blank Subframe (ABS).

22. The apparatus of claim 18, wherein the plurality of patterns of one or more protected subframes each comprise a bitmap with one or more bits set to a value to indicate the one or more protected subframes.

23. The apparatus of claim 22, wherein the bitmap of a pattern corresponding to 'k' protected subframes differs from the bitmap of a pattern corresponding to 'k+1' protected subframes by a single bit value.

24. An apparatus for wireless communications, comprising:
means for generating a plurality of patterns of bits, wherein each bit represents whether or not a corresponding subframe is protected by limiting transmission of an evolved Node B (eNB) and wherein each protected subframe of a pattern of bits of the plurality of patterns of bits representing 'k' protected subframes overlaps with a corresponding protected subframe of another pattern of bits of the plurality of patterns of bits representing 'k+1' protected subframes, wherein k comprises an integer value greater than zero; and
means for transmitting the plurality of patterns of bits to potentially interfering eNBs.

25. The apparatus of claim 24, wherein the one or more protected subframes comprise an Almost Blank Subframe (ABS).

26. The apparatus of claim 24, wherein the plurality of patterns of one or more protected subframes each comprise a bitmap with one or more bits set to a value to indicate the one or more protected subframes.

27. The apparatus of claim 26, wherein the bitmap of a pattern corresponding to 'k' protected subframes differs from the bitmap of a pattern corresponding to 'k+1' protected subframes by a single bit value.

28. An apparatus for wireless communications, comprising:
means for receiving, at the apparatus, a plurality of patterns of one or more protected subframes in which use by an interfering evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero; and
means for receiving, at the apparatus, an indication of one or more selected patterns of the plurality of patterns from one or more respective interfering eNBs.

29. The apparatus of claim 28, further comprising means for determining a portion of a selected pattern of the received selected patterns that is static or semi-static based on the received indication of the one or more selected patterns.

30. The apparatus of claim 28, further comprising means for sending information identifying one or more protected subframes based on the received indication of the one or more selected patterns to a user equipment (UE).

31. The apparatus of claim 30, further comprising at least one of means for transmitting data to the UE or means for receiving data from the UE using one or more of the identified one or more protected subframes.

32. The apparatus of claim 28, wherein the one or more protected subframes comprise an Almost Blank Subframe (ABS).

33. The apparatus of claim 28, wherein the plurality of patterns of one or more protected subframes each comprise a bitmap with one or more bits set to a value to indicate the one or more protected subframes.

34. The apparatus of claim 33, wherein the bitmap of a pattern corresponding to 'k' protected subframes differs from the bitmap of a pattern corresponding to 'k+1' protected subframes by a single bit value.

35. An apparatus for wireless communications, comprising:
memory storing instructions; and
at least one processor coupled to said memory and upon executing the instructions performs the following:
receive a plurality of patterns of one or more protected subframes in which use by an evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero;
select one of the plurality of patterns; and
limit transmissions during protected subframes of the selected pattern.

36. The apparatus of claim 35, wherein the memory comprises one or more additional instructions that, upon executing the processor performs the following:
determine an amount of resources that may be donated for use by another eNB; and
select one of the patterns based on the determined amount.

37. The apparatus of claim 35, wherein the memory comprises one or more additional instructions that, upon executing the processor performs the following: send information identifying one or more protected subframes based on the selected pattern.

38. The apparatus of claim 35, wherein the one or more protected subframes comprise an Almost Blank Subframe (ABS).

39. The apparatus of claim 35, wherein the plurality of patterns of one or more protected subframes each comprise a bitmap with one or more bits set to a value to indicate the one or more protected subframes.

40. The apparatus of claim 39, wherein the bitmap of a pattern corresponding to 'k' protected subframes differs from the bitmap of a pattern corresponding to 'k+1' protected subframes by a single bit value.

41. An apparatus for wireless communications, comprising:
memory storing instructions; and
at least one processor coupled to said memory and upon executing the instructions performs the following:
generate a plurality of patterns of bits, wherein each bit represents whether or not a corresponding subframe is protected by limiting transmission of an evolved Node B (eNB) and wherein each protected subframe of a pattern of bits of the plurality of patterns of bits representing 'k' protected subframes overlaps with a corresponding protected subframe of another pattern of bits of the plurality of patterns of bits representing 'k+1' protected subframes, wherein k comprises an integer value greater than zero; and
transmit the plurality of patterns of bits to potentially interfering eNBs.

42. The apparatus of claim 41, wherein the one or more protected subframes comprise an Almost Blank Subframe (ABS).

43. The apparatus of claim 41, wherein the plurality of patterns of one or more protected subframes each comprise a bitmap with one or more bits set to a value to indicate the one or more protected subframes.

44. The apparatus of claim 43, wherein the bitmap of a pattern corresponding to 'k' protected subframes differs from the bitmap of a pattern corresponding to 'k+1' protected subframes by a single bit value.

45. An apparatus for wireless communications, comprising:
memory storing instructions; and
at least one processor coupled to said memory and upon executing the instructions performs the following:
receive, at the apparatus, a plurality of patterns of one or more protected subframes in which use by an interfering evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero; and
receive, at the apparatus, an indication of one or more selected patterns of the plurality of patterns from one or more respective interfering eNBs.

46. The apparatus of claim 45, wherein the memory comprises one or more additional instructions that, upon executing the processor performs the following: determine a portion of a selected pattern of the received selected patterns that is static or semi-static based on the received indication of the one or more selected patterns.

47. The apparatus of claim 45, wherein the memory comprises one or more additional instructions that, upon executing the processor perform the following: send information identifying one or more protected subframes based on the received indication of the one or more selected patterns to a user equipment (UE).

48. The apparatus of claim 47, wherein the memory comprises one or more additional instructions that, upon executing the processor performs the following: at least one of transmit data to the UE or receive data from the UE using one or more of the identified one or more protected subframes.

49. The apparatus of claim 45, wherein the one or more protected subframes comprise an Almost Blank Subframe (ABS).

50. The apparatus of claim 45, wherein the plurality of patterns of one or more protected subframes each comprise a bitmap with one or more bits set to a value to indicate the one or more protected subframes.

51. The apparatus of claim 50, wherein the bitmap of a pattern corresponding to 'k' protected subframes differs from the bitmap of a pattern corresponding to 'k+1' protected subframes by a single bit value.

52. A computer-program product for wireless communication, the computer-program product comprising a non-transitory computer-readable medium having code stored thereon, the code executable by one or more processors for:
receiving a plurality of patterns of one or more protected subframes in which use by an evolved Node B (eNB) is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero;
selecting one of the plurality of patterns; and
limiting transmissions during protected subframes of the selected pattern.

53. The computer-program product of claim 52, comprising:
code for determining an amount of resources that may be donated for use by another eNB; and
code for selecting one of the patterns based on the determined amount.

54. The computer-program product of claim 52, further comprising code for sending information identifying one or more protected subframes based on the selected pattern.

55. The computer-program product of claim 52, wherein the one or more protected subframes comprise an Almost Blank Subframe (ABS).

56. The computer-program product of claim 52, wherein the plurality of patterns of one or more protected subframes each comprise a bitmap with one or more bits set to a value to indicate the one or more protected subframes.

57. The computer-program product of claim 56, wherein the bitmap of a pattern corresponding to 'k' protected subframes differs from the bitmap of a pattern corresponding to 'k+1' protected subframes by a single bit value.

58. A computer-program product for wireless communication, the computer-program product comprising a non-transitory computer-readable medium having code stored thereon, the code executable by one or more processors for:
generating a plurality of patterns of bits, wherein each bit represents whether or not a corresponding subframe is protected by limiting transmission of an evolved Node B (eNB) and wherein each protected subframe of a pattern of bits of the plurality of patterns of bits representing 'k' protected subframes overlaps with a corresponding protected subframe of another pattern of bits of the plurality of patterns of bits representing 'k+1' protected subframes, wherein k comprises an integer value greater than zero; and
transmitting the plurality of patterns of bits to potentially interfering eNBs.

59. The computer-program product of claim 58, wherein the one or more protected subframes comprise an Almost Blank Subframe (ABS).

60. The computer-program product of claim 58, wherein the plurality of patterns of one or more protected subframes each comprise a bitmap with one or more bits set to a value to indicate the one or more protected subframes.

61. The computer-program product of claim 60, wherein the bitmap of a pattern corresponding to 'k' protected subframes differs from the bitmap of a pattern corresponding to 'k+1' protected subframes by a single bit value.

62. A computer-program product for wireless communication, the computer-program product comprising a non-transitory computer-readable medium having code stored thereon, the code executable by one or more processors for:
receiving, at an evolved Node B (eNB), a plurality of patterns of one or more protected subframes in which use by an interfering eNB is limited, wherein each protected subframe of a pattern of the plurality of patterns representing 'k' protected subframes overlaps with a corresponding protected subframe of another pattern of the plurality of patterns representing 'k+1' protected subframes, wherein k comprises an integer value greater than zero; and
receiving, at the eNB, an indication of one or more selected patterns of the plurality of patterns from one or more respective interfering eNBs.

63. The computer-program product of claim 62, further comprising code for determining determine a portion of a selected pattern of the received selected patterns that is static or semi-static based on the received indication of the one or more selected patterns.

64. The computer-program product of claim 62, further comprising code for sending information identifying one or more protected subframes based on the received indication of the one or more selected patterns to a user equipment (UE).

65. The computer-program product of claim 64, further comprising code for at least one of transmitting data to the UE or for receiving data from the UE using one or more of the identified one or more protected subframes.

66. The computer-program product of claim 62, wherein the one or more protected subframes comprise an Almost Blank Subframe (ABS).

67. The computer-program product of claim 62, wherein the plurality of patterns of one or more protected subframes each comprise a bitmap with one or more bits set to a value to indicate the one or more protected subframes.

68. The computer-program product of claim 67, wherein the bitmap of a pattern corresponding to 'k' protected subframes differs from the bitmap of a pattern corresponding to 'k+1' protected subframes by a single bit value.

* * * * *